May 20, 1952 S. I. CORY 2,597,071

SIGNAL MONITORING

Filed Aug. 14, 1948

INVENTOR
S. I. CORY
BY
ATTORNEY

Patented May 20, 1952

2,597,071

UNITED STATES PATENT OFFICE 2,597,071

SIGNAL MONITORING

Samuel I. Cory, Towaco, N. J., assignor to Bell Telephone Laboratories, Incorporated, New York, N. Y., a corporation of New York Application August 14, 1948, Serial No. 44,239

10 Claims. (Cl. 178—69)

This invention relates to printing telegraph systems and more particularly to start-stop automatic telegraph monitoring sets for determining the quality of message transmission furnished to a telegraph loop or line circuit.

An object of the present invention is to automatically furnish an indication whenever the distortion in start-stop teletypewriter signals exceeds a definite value a specified number of times within an interval of predetermined duration.

Monitoring of telegraph circuits to locate intermittent troubles which have caused service complaints has been generally had in the past by assigning an attendant to observe the transmission over a period of time with a teletypewriter or a sounder. With complex circuits such as "round robin" circuits now used by news gathering and disseminating agencies, this procedure becomes undesirable because of cost and interference with other test-room work. It has been felt for some time that service might be improved and some saving realized by employing an automatic monitoring device for this purpose.

An automatic monitoring device heretofore used to furnish an indication of the presence of excessive distortion in incoming signals is the shortest-pulse type whereby excessive distortion is indicated when the length of an incoming pulse is shorter than a predetermined minimum, that is, shorter than a unit length impulse.

According to the present invention, the automatic telegraph service monitoring set is arranged to operate on a start-stop basis and indicates distortion resulting from the displacement of transitions in the teletypewriter signals. The occurrence of a specified number of distortions greater than a predetermined amount within an interval of definite duration is arranged to operate an alarm. The set is thus responsive to "hits" on the line circuit, which would produce errors at a receiving teletypewriter or reperforator.

The set is so arranged that transient impulses of fixed amplitude which are produced at transitions in an incoming character signal wave are combined directly with the voltage pulses produced in the output of a pulse-timing gas-tube multivibrator or a pulse-timing vacuum tube oscillator, and the resultant of the combined voltages is applied through a full wave rectifying circuit to the grid of a gas tube. The gas tube has its cathode circuit adjusted to cause the tube to "fire" only when the combined voltages attain a value in excess of the fixed amplitude of the transient impulses, which occurs whenever the incoming character signal is sufficiently distorted to cause an error in the printed copy at a receiving teletypewriter. The impulses, if any, produced in the output of the gas tube are stored for an interval of predetermined duration and if the potential of the stored impulses does not attain a predetermined value at the expiration of such interval, the potential is automatically discharged to ground. Should, however, the stored potential attain the predetermined value before the expiration of the interval an alarm circuit would operate to furnish an indication that the distortion in the signals incoming over the line is of a serious nature.

A feature of the invention is to provide a simple, practical monitoring set for teletypewriter lines operated at comparatively high speeds.

In the accompanying drawing.

*General description*

Figures 1, 2, 3:
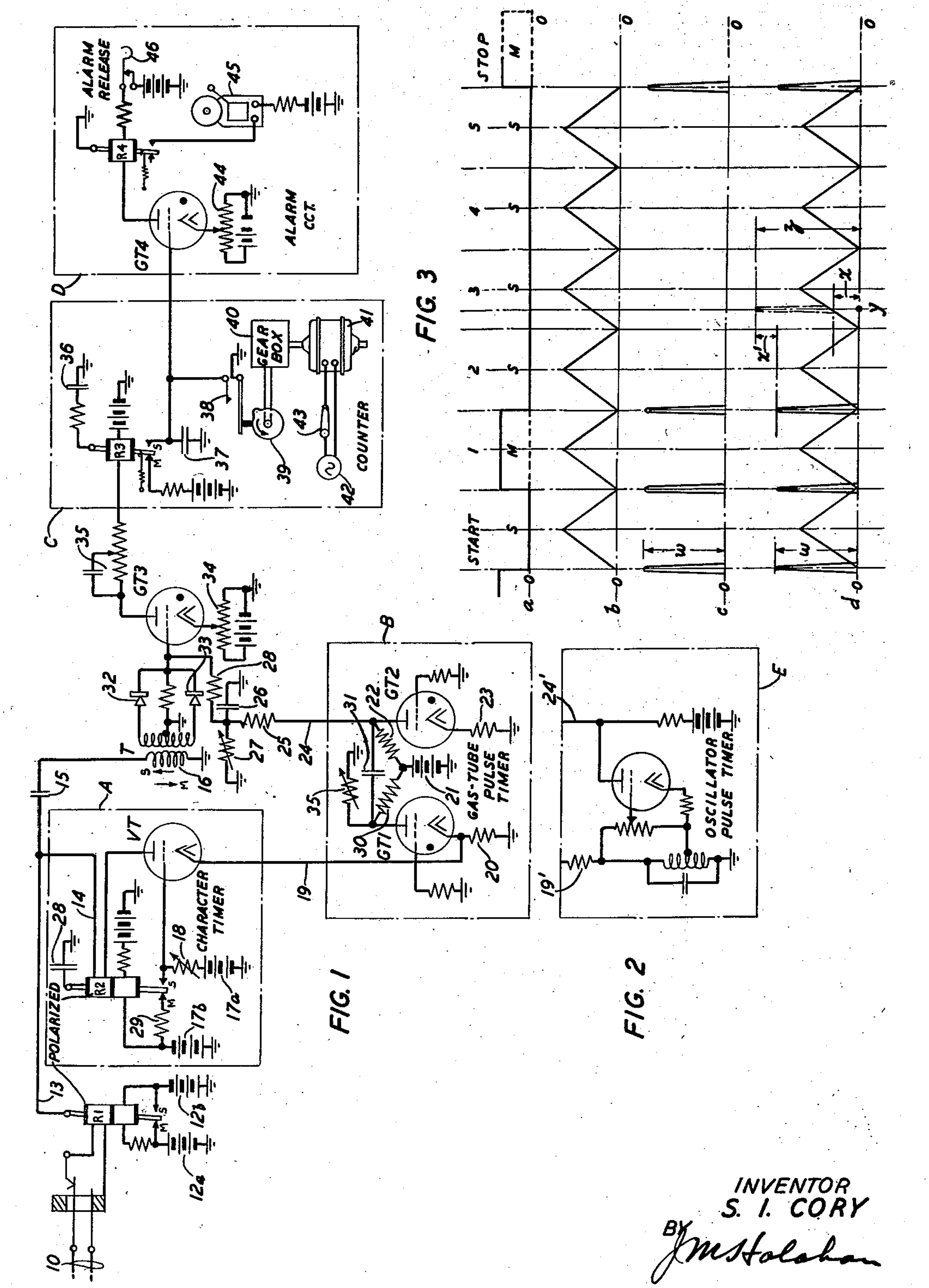
Fig. 1 shows a schematic arrangement according to the invention whereby the monitoring circuit at a switchboard may be connected to a line circuit by means of a patching cord in order to monitor the line for excessive distortion or "hits" in the message signals incoming over the line.
Fig. 2 shows a pulse-timing vacuum tube oscillator circuit which may be substituted for the pulse-timing gas tube multivibrator shown in Fig. 1.
Fig. 3 illustrates graphically a character signal wave incoming at the monitor set and the resulting changes when such wave is combined with timed oscillations produced in the set.

Referring to the schematic arrangement shown in Fig. 1, patching cord 10 is assumed to connect the monitoring set at jack 11, to a line circuit, not shown.

The monitoring set comprises a character signal timer A, a pulse-timer B of the gas tube type, a counter circuit C and an alarm circuit D. By means of receiving relay R1, condenser 15 and transformer T there is produced in the secondary winding of transformer T, at each transition in a signal wave incoming over patching cord 10, a transient voltage impulse. These transient impulses are of uniform amplitude and flow through a full wave rectifying circuit to be impressed on the grid element of gas tube GT3. The voltage pulses generated in pulse-timer B are passed through a wave shaping network and are also impressed on the grid element of gas tube GT3. When there is no distortion present in the incoming signal, the transient voltage impulses occur at points of zero value in the output voltage of the wave shaping network connected to the output circuit of the pulse timer, but when distortion is present they attain an amplitude increased by the amplitude of the output voltage at points between the zero and peak values, the exact point depending upon the amount of distortion present in the signal. The additive effect of the combined voltages resulting from a distorted signal impulse produces a voltage exceeding that of uniform amplitude produced by undistorted signal impulses and overcomes the grid-biasing effect produced by potentiometer 34 and the associated battery to make each time this tube GT3 momentarily conductive whereby a charge is stored in the counter circuit. At the expiration of a period of definite duration the total charge stored in the counter circuit is automatically discharged. However, should the stored charge exceed within the specified period of time a predetermined value gas tube GT4 would "fire" and remain conductive to operate the alarm circuit.

Gas tubes GT3 and GT4 and also gas tubes GT1 and GT2 of the pulse-timer B are of the thyratron type.

*Operation in detail*

The line circuit under test is assumed to be normally closed, that is, to have current flowing therein, to normally maintain polarized receiving relay R1 in its marking position as shown, the circuit being traceable through the upper winding of the relay. Relay R1 in its marking, or left-hand, position, connects grounded positive battery 12*a* to conductor 13 in a circuit having two paths, one extending over conductor 14, through the upper winding of polarized relay R2, to the plate element of vacuum tube VT and the other path extending through condenser 15, primary winding 16 of transformer T, to ground. Positive potential of grounded positive battery 17*a* is applied through timing resistor 18 to the grid element of vacuum tube VT, and since the plate of this tube is at a positive potential, plate current normally flows through the operating, or upper, winding of relay R2, plate and cathode element of vacuum tube VT, conductor 19, biasing resistor 20 in pulse-timer B to ground. Therefore, the armature of relay R2 is held to its marking contact M by this current, causing condenser 28 to be charged to a negative potential from battery 17*b*. Also, current flowing through biasing resistor 20 causes the grid element of gas tube GT1 to be negatively biased a sufficient amount to prevent tube GT1 from "firing." At this time, tube GT2 is conducting to cause a current to flow from grounded positive battery 21, resistor 22, plate and cathode elements of tube GT2, biasing resistor 23, to ground. Once tube GT2 conducts its grid no longer has control and the output of the pulse timer B when no signals are incoming over the line is a continuous positive potential of low value, the output circuit being traceable over conductor 24, resistor 25 of high resistance value, and then through a shaping network in parallel paths, one extending through condenser 26 to ground, another through adjustable resistor 27 to ground and still another through resistor 28 to the grid of gas tube GT3.

When the monitoring set receives a teletypewriter character signal from the line, the first, or start, transition of the signal causes relay R1 to operate to its spacing contact under the influence of the biasing current in the lower winding of the relay, thus applying negative potential to conductor 13 from battery 12*b*. This causes a current pulse to flow through condenser 15 and the primary winding of transformer T wherein a short, sharp voltage impulse is produced in the secondary winding of transformer T. Also, the plate element of tube VT becomes negative whereby the current previously flowing in the path extending through the plate and cathode elements of tube VT, conductor 19, resistor 20, to ground ceases to flow. With no current flowing in the upper winding of relay R2 the biasing current in the lower winding operates the armature of relay R2 to its spacing contact. Relay R2, upon operating to its spacing contact, disconnects condenser 28 from negative battery 17*b* and connects it to the positive battery 17*a* through timing resistor 18, thus causing the grid of tube VT to become negative. Slowly, condenser 28 begins to discharge its negative potential and then charges towards the positive potential of battery 17*a*. The charge on condenser 28, and hence on the grid element of tube VT does not reach a sufficiently positive value to permit plate current to again flow in the tube until the "stop" pulse of the incoming character signal is received, at which time the plate of the tube is made positive due to the armature of relay R1 having returned to its marking contact M. Until this time the operation of the armature of relay R1 to its marking contact in response to transitions in the incoming signal can cause no current to flow in the plate circuit of this tube because of its grid being negative due to the slow charging of condenser 28.

The cessation of plate current in tube VT at the start of an incoming signal reduces the negative bias on the grid element of tube GT1 and tube GT1 is thereby permitted to "fire" or conduct. This in turn causes the plate potential of tube GT2 to drop suddenly below the value required to sustain current flow, due to the action of condenser 31 in cooperation with resistors 30 and 22. Tube GT2 is thereby extinguished in the well-known manner for this type of circuit as described on page 478 of the second edition, 1944, of a book entitled "Theory and Application of Electron Tubes" by H. J. Reich and published by McGraw-Hill Book Company, New York. When tube GT1 is "fired," the potential drop across resistor 30 charges condenser 31 through resistor 22 to a voltage equal to the supply voltage of battery 21 less the voltage drop in the circuit including the plate and cathode element of tube GT1 and resistor 20. The polarity of the charge is such that the right-hand terminal of condenser 31 is positive relative to the left-hand terminal. When the positive potential on the right-hand terminal of condenser 31 attains a sufficient value tube GT2 again "fires" thereby effectively reducing the plate voltage of tube GT1 below its sustaining value and extinguishing tube GT1. The potential drop across resistor 22 charges condenser 31 through resistor 30 to a voltage equal to the supply voltage of battery 21 less the voltage drop in the circuit including the plate and cathode elements of tube GT2 and resistor 23. The polarity is such that the left-hand terminal of condenser 31 is positive relative to the right-hand terminal. When the positive potential of the left-hand terminal of condenser 31 attains a sufficient value tube GT1 again "fires" and GT2 becomes extinguished. This alternate operation of tubes GT1 and GT2 is continuous during the reception of the teletypewriter character signal, the values of resistors 30 and 22, and condenser 31 being adjusted to result in an output voltage wave on conductor 24 having twice the frequency of the impulses in the teletypewriter character signal, that is, there is a complete cycle in the operation of the pulse-timer B for each half-cycle in the character signal. The output voltage from the pulse timer is applied to the wave shaping network comprising resistors 25 and 27 and condenser 26 which is adjusted to produce the triangular output voltage wave shown at *b* in Fig. 3. The last, or "stop" impulse of the incoming character signal operates relay R1 to its marking contact M thereby applying positive potential to the plate of tube VT, and since condenser 28 has now attained a sufficiently positive potential, tube VT becomes conducting again, that is, until the start transition of the next incoming character signal is received.

The transient voltage impulses produced in the secondary winding of transformer T in response to the incoming signals as hereinbefore described flow through rectifiers 32 and 33 to produce unidirectional pulses of uniform amplitude which are applied to the grid element of gas tube GT3. The pulses received from the pulse timer through the shaping network and resistor 28 are also applied to the grid element of gas tube GT3. The cathode circuit of gas tube GT3 is adjusted by means of potentiometer 34 to make the tube conducting only when the grid voltage exceeds a predetermined value.

The method of operation may be further described by referring to the graphs shown in Fig. 3.

Graph *a* shows an incoming character signal wave for letter E and the first transition appears at the beginning of the "start" impulse. The first transition operates the armature of relay R1 to its spacing contact S, and this in turn causes relay R2 to operate to its spacing contact S to start the functions hereinbefore described. Graph *b* shows the triangular output voltage wave produced by the pulse timer B in conjunction with the wave shaping network comprising resistor 25, condenser 26 and resistor 27 during the time that the signal for letter E is being received. When relay R1 operates to either its spacing or marking contact in response to a transition in the character signal wave a transient voltage impulse of uniform amplitude *w* is produced in the output of transformer T, each impulse so produced being of either positive or negative polarity depending on whether the transition is from space to mark or mark to space. Rectifiers 32 and 33 in this output circuit of transformer T convert these transient voltage impulses of uniform amplitude to unidirectional impulses as shown in graphs *c* and *d* and the circuit is adjusted so that these transient voltage impulses are of somewhat greater amplitude than the amplitude of the output voltage of graph *b*. The transient impulses shown in graph *c* are superposed on the output voltage wave of graph *b* and when there is no distortion present in the incoming character signal these transient impulses respectively occurring at the transition points in the signal wave, appear as shown in graph *d* at their corresponding points of zero voltage in the output voltage wave *b*. When distortion is present in the incoming character signal the transient impulses do not appear at the points of zero voltage but are displaced, that is, they appear at other points, depending on the percentage of distortion present, along the increasing or decreasing values of output voltage such as the transient impulse shown at point *y* in graph *d*. The additive effect of the transient impulse in a distorted signal impulse superposed on the corresponding voltage value in the output voltage wave shown in graph *b* is indicated by *z* shown at point *y* in graph *d*, the increase *x'* in voltage shown in graph *d* being directly proportional to the distortion present at the corresponding transition point in the incoming signal.

Gas tube GT3 is adjusted as hereinbefore stated to become conductive when distortion in excess of a predetermined amount is present. With the incoming signals distorted to an amount producing an additive voltage in excess of that indicated at *w* in graphs *c* and *d*, potentiometer 34 may be adjusted so that tube GT3 just responds to this predetermined amount. Tube GT3 will then respond whenever this predetermined amount of distortion is attained or exceeded. Tube GT3 is self-extinguishing due to the use of the condenser-resistance circuit 35.

Each time that tube GT3 becomes conductive, relay R3 in the counter circuit C is momentarily operated to its spacing contact and the charge normally stored on condenser 36 is mixed, with the charge, if any, on condenser 37 which is of large capacity compared to that of condenser 36. Any potential on condenser 37 is periodically discharged by means of contact 38 which is arranged to close a circuit to ground at regularly recurring intervals. The closure of contact 38 to ground is completed once in each revolution of cam 39 which is rotated at a suitable speed through a system of gears in gear box 40 from motor 41 driven from a source 42 of alternating current when locking switch 43 is closed. However, if the potential cumulatively stored in condenser 37 exceeds a predetermined amount determined by the adjustment of potentiometer 44 in the cathode circuit of gas tube GT4, tube GT4 will become conductive to operate relay R4 which, upon operating, furnishes an audible alarm by ringing bell 45. Gas tube GT4 may be extinguished and the operation of bell 45 stopped by operating release key 46.

In place of the gas tube pulse timer B, vacuum tube pulse timer of the type schematically shown within box E in Fig. 2 may be substituted by respectively connecting conductors 19' and 24' in Fig. 2 to conductors 19 and 24 in Fig. 1. A conventional multivibrator employing vacuum tubes may also be substituted for the gas-tube pulse timer B, such as shown on page 362 of Reich's book entitled "Theory and Application of Electron Tubes," supra.

What is claimed is:

1. A telegraph signal monitoring set for indicating distortion in incoming telegraph signals comprising means for receiving telegraph signals, impulse circuit means responsive to said receiving means for producing a short impulse of fixed amplitude at each transition of an incoming signal, oscillatory circuit means controlled by said receiving means and adapted to produce a series of pulses and synchronized to produce one of said pulses at each of the possible transitions in an incoming signal, circuit means for additively combining said short impulses and said synchronized pulses, and alarm means controlled by said combining circuit upon the occurrence during a predetermined time interval of a predetermined minimum number of additive combinations exceeding a predetermined amplitude.

2. A telegraph signal monitoring set for indicating distortion in incoming start-stop telegraph signals comprising means for receiving start-stop telegraph signals, a plurality of means responsive to said receiving means, one of the second-mentioned means comprising a capacity-inductance network for producing a short voltage impulse of fixed amplitude at each transition of an incoming signal and another of the second-mentioned means comprising timing circuit means, oscillatory circuit means responsive to said timing circuit means to produce a series of voltage pulses and synchronized to produce one of said pulses at each of the possible transitions in an incoming start-stop signal, circuit means for additively combining said short impulses and said synchronized pulses, and alarm means controlled by said combining circuit upon the occurrence during a predetermined time interval of a predetermined minimum number of additive combinations each exceeding a predetermined amplitude.

3. A telegraph signal monitoring set for indicating distortion in incoming start-stop telegraph signals comprising means for receiving start-stop telegraph signals, a plurality of means operative in parallel in response to said receiving means, one of the second-mentioned means comprising a capacity-inductance network for producing a short voltage impulse of fixed amplitude at each transition of an incoming signal and another of the second-mentioned means comprising timing circuit means, oscillatory circuit means responsive to said timing circuit means to produce a series of voltage pulses and synchronized to produce one of said pulses at each of the possible transitions in an incoming start-stop signal, circuit means for additively combining said short impulses and said synchronized pulses, and alarm means controlled by said combining circuit upon the occurrence during a predetermined time interval of a predetermined minimum number of additive combinations each of which exceeds a predetermined amplitude.

4. A telegraph signal monitoring set for indicating distortion in incoming start-stop telegraph signals comprising means for receiving start-stop telegraph signals, a plurality of means operative in parallel in response to said receiving means, one of the second-mentioned means comprising a capacity-inductance network for producing a short voltage impulse of fixed amplitude at each transition of an incoming signal and another of the second-mentioned means comprising signal repeating means, a timing circuit controlled by said repeating means, a normally conducting electronic circuit connected in series with said repeating means and means controlled by said timing means for making said electronic circuit non-conducting for the approximate duration of a start-stop signal, oscillatory circuit means responsive to the non-conducting condition of said electronic circuit to produce a definite number of voltage pulses and synchronized to produce one of said pulses for each of the possible transitions in an incoming start-stop signal, circuit means for additively combining said short impulses and said synchronized pulses, and alarm means controlled by said combining circuit upon the occurrence during a predetermined time interval of a predetermined minimum number of additive combinations each exceeding a predetermined amplitude.

5. A telegraph signal monitoring set for indicating distortion in incoming telegraph signals comprising means for receiving start-stop telegraph signals, impulse circuit means responsive to said receiving means for producing a short impulse of fixed amplitude at each transition of an incoming signal, means for converting said short impulses to unidirectional impulses, oscillatory circuit means controlled by said receiving means adapted to produce a series of pulses and synchronized to produce one of said pulses for each of the possible transitions in an incoming signal, circuit means for additively combining said short unidirectional impulses and said synchronized pulses, means responsive to those of said unidirectional impulses having an amplitude in excess of a predetermined value, and alarm means controlled by said last mentioned means upon response thereof to a predetermined minimum number of said unidirectional impulses within a predetermined time interval.

6. A telegraph signal monitoring set for indicating distortion in incoming telegraph signals comprising means for receiving start-stop telegraph signals, impulse circuit means responsive to said receiving means for producing a short impulse of fixed amplitude at each transition of an incoming signal, rectifying means for converting said short impulses to unidirectional impulses, oscillatory circuit means controlled by said receiving means adapted to produce a series of pulses and synchronized to produce one of said pulses for each of the possible transitions in an incoming signal, circuit means for additively combining said unidirectional short impulses and said synchronized pulses, an electronic circuit responsive to those of said unidirectional impulses having an amplitude in excess of a predetermined value, and alarm means controlled by said electronic circuit upon response thereof to a predetermined minimum number of said unidirectional impulses within a predetermined time interval.

7. A telegraph signal monitoring set for indicating distortion in incoming telegraph signals comprising means for receiving start-stop telegraph signals, impulse circuit means responsive to said receiving means for producing a short impulse of fixed amplitude at each transition of an incoming signal, oscillatory circuit means controlled by said receiving means adapted to produce a series of pulses and synchronized to produce one of said pulses for each of the possible transitions in an incoming signal, circuit means for additively combining said short impulses and said synchronized impulses, a counting circuit comprising capacity means for storing potentials in response to those of said additive combinations having an amplitude in excess of a predetermined value, means for timing a definite interval, means operable by said timing means for discharging the stored potential in said capacity and alarm means responsive to the potential on said capacity means when said potential exceeds a predetermined level before the expiration of said timed interval.

8. A telegraph signal monitoring set for indicating distortion in incoming telegraph signals comprising means for receiving start-stop telegraph signals, impulse circuit means responsive to said receiving means for producing a short impulse of fixed amplitude at each transition of an incoming signal, oscillatory circuit means comprising a gas-tube multivibrator controlled by said receiving means, adapted to produce a series of pulses and synchronized to produce one of said pulses at each of the possible transitions in said incoming signals, circuit means for combining said short impulses and said synchronized pulses, and alarm means controlled by said combining circuit means upon the production thereby of a predetermined minimum number of combinations each having an amplitude exceeding a predetermined value within a predetermined time interval.

9. In a telegraph signal monitoring set, means for receiving code combinations of impulses, means activated at the beginning of each code combination for generating a voltage wave having a cyclic relation to the impulses of said code combination, means for generating a short, sharp voltage pulse of fixed amplitude in response to each impulse transition of a received code combination, means for superimposing said sharp voltage pulses on said voltage wave, means for cumulatively registering occurrences of said sharp voltage pulses at points relative to said voltage wave which produce resultant voltages exceeding a predetermined value, means operable at uniform time intervals for canceling the registrations in said registering means, and alarm means operable by said registering a predetermined number of said occurrences within any of said uniform time intervals.

10. In a telegraph signal monitoring set, means for receiving signals, means for detecting distortion in said signals comprising time displacement of the pulse transitions thereof, a capacitor, means for impressing a predetermined charge on said capacitor, a second capacitor, relay means responsive to occurrences of pulse transition displacement exceeding a predetermined magnitude for discharging said first capacitor into said second capacitor, alarm means controlled by said second capacitor and operable upon the discharging of said first capacitor into said second capacitor a predetermined number of times, and means operable at uniform time intervals for discharging said second capacitor.

SAMUEL I. CORY.

REFERENCES CITED

The following references are of record in the file of this patent:

UNITED STATES PATENTS

| Number | Name | Date |
|---|---|---|
| 1,829,185 | Herman | Oct. 27, 1931 |
| 2,007,371 | Hopkins | July 9, 1935 |
| 2,132,678 | Cowan | Oct. 11, 1938 |
| 2,173,534 | Erickson | Sept. 19, 1939 |
| 2,176,742 | La Pierre | Oct. 17, 1939 |
| 2,206,452 | Cory | July 2, 1940 |
| 2,206,453 | Weaver | July 2, 1940 |
| 2,275,930 | Torcheuz | Mar. 10, 1942 |

FOREIGN PATENTS

| Number | Country | Date |
|---|---|---|
| 437,539 | Great Britain | Oct. 31, 1935 |

OTHER REFERENCES

W. T. Rea: Telegraph Transmission Measuring Set, pp. 174–178, Bell Laboratories Record, Dec. 1943.